(12) United States Patent
Takai (10) Patent No.: US 11,708,710 B2
(45) Date of Patent: Jul. 25, 2023

(54) GLOVE COMPARTMENT LOCK DEVICE

(71) Applicant: TOYODA GOSEI CO., LTD., Kiyosu (JP)

(72) Inventor: Hiroki Takai, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 314 days.

(21) Appl. No.: 17/290,286

(22) PCT Filed: Sep. 12, 2019

(86) PCT No.: PCT/JP2019/035823
§ 371 (c)(1),
(2) Date: Apr. 30, 2021

(87) PCT Pub. No.: WO2020/110423
PCT Pub. Date: Jun. 4, 2020

(65) Prior Publication Data
US 2021/0381286 A1 Dec. 9, 2021

(30) Foreign Application Priority Data
Nov. 30, 2018 (JP) ................................. 2018-225764

(51) Int. Cl.
*E05B 83/30* (2014.01)
*B60R 7/06* (2006.01)
(Continued)

(52) U.S. Cl.
CPC ................ *E05B 83/30* (2013.01); *B60R 7/06* (2013.01); *E05C 1/12* (2013.01); *E05C 9/04* (2013.01); *E05C 9/085* (2013.01); *E05C 1/004* (2013.01)

(58) Field of Classification Search
CPC ....... Y10T 292/57; E05B 83/30; E05B 83/28; E05B 7/00; E05B 5/00; E05B 5/006;
(Continued)

(56) References Cited

U.S. PATENT DOCUMENTS 3,374,021 A * 3/1968 Ronalds .................. E05B 83/36
292/336.3
4,907,833 A * 3/1990 Ogasawara ............. E05B 77/36
292/336.3
(Continued)

FOREIGN PATENT DOCUMENTS

CN 108868393 A * 11/2018 ............. E05B 83/30
JP 08207668 A * 8/1996 ............. E05B 65/12
(Continued)

OTHER PUBLICATIONS

Yang, KR-860003652-Y1, Oct. 31, 1984, USPTO Search machine translation (Year: 2023).*
(Continued)

*Primary Examiner* — Kristina R Fulton
*Assistant Examiner* — Steven A Tullia
(74) *Attorney, Agent, or Firm* — Posz Law Group, PLC (57) ABSTRACT

A glove compartment lock device includes: a base member attached to a glove compartment; a knob member supported by the base member so as to be rotatable around a shaft portion between a closed position and an opened position; an arm member supported at a center portion in a longitudinal direction thereof by the base member so as to be swingable between a locked position and an unlocked position of the glove compartment and configured to come into contact with the knob member at one end portion thereof; and a spring member locked at one end portion thereof to the knob member, locked at another end portion thereof to another end portion of the arm member, and configured to generate
(Continued)

a biasing force that rotates the knob member to the closed position and swings the arm member to the locked position. A rotation direction around the shaft portion in which the one end portion of the spring member rotates the knob member to the closed position and a rotation direction around the shaft portion in which the other end portion of the spring member swings the arm member to the locked position are opposite to each other.

4 Claims, 5 Drawing Sheets

(51) Int. Cl.
*E05C 1/12* (2006.01)
*E05C 9/04* (2006.01)
*E05C 9/08* (2006.01)
*E05C 1/00* (2006.01)

(58) Field of Classification Search
CPC ........ E05B 85/10; E05B 85/102; E05B 85/12; E05B 85/14; E05B 85/16; E05B 2015/0403; E05B 2015/0406; E05B 2015/041; E05B 2015/0437; E05B 2015/0441; B60R 7/06; E05C 1/12; E05C 1/004; E05C 9/04; E05C 9/085; E05C 1/00; E05C 1/08; E05C 1/14; E05C 1/145; E05C 9/043; E05C 9/08; E05C 9/16

See application file for complete search history.

(56) References Cited

U.S. PATENT DOCUMENTS

| 5,292,159 | A | * | 3/1994 | Sandhu | .................... E05B 77/06 |
| | | | | | 292/DIG. 31 |
| 2017/0218667 | A1 | * | 8/2017 | Lane | ........................ E05B 83/02 |
| 2020/0408010 | A1 | * | 12/2020 | Takai | ....................... E05B 83/30 |

FOREIGN PATENT DOCUMENTS

| JP | H8-207668 A | | 8/1996 | | |
| KR | 860003652 Y1 | * | 10/1984 | ............. | E05B 83/42 |
| KR | 20030070949 A | * | 2/2002 | ............. | E05B 83/30 |
| KR | 20050042899 A | * | 3/2011 | ............. | E05B 83/30 |

OTHER PUBLICATIONS

Yang, KR-860003652-Y1, Oct. 31, 1984, Google Patents download (Year: 2023).*

International Search Report dated Nov. 26, 2019, issued in corresponding International Patent Application No. PCT/JP2019/035823.

* cited by examiner

Fig. 9

GLOVE COMPARTMENT LOCK DEVICE

Cross Reference to Related Application

This application is a U.S. National Stage Application of International Application No. PCT/JP2019/035823, filed on Sep. 12, 2019, and is based on Japanese Patent Application No. 2018-225764 filed on Nov. 30, 2018, the contents of which are incorporated herein by reference.

TECHNICAL FIELD

The present invention relates to a glove compartment lock device that is mounted, for example, on a vehicle.

BACKGROUND ART

Hitherto, a glove compartment lock device that is mounted, for example, on a vehicle has been known (for example, Patent Literature 1). The glove compartment lock device includes a base member, a knob member, a dog member, and a spring member. The base member is attached to a glove compartment. The knob member is a member that is disposed on the front side of the glove compartment and on which an opening operation is performed by an operator, and is supported by the base member so as to be rotatable between a closed position and an opened position. The knob member is locked to the dog member. The dog member is attached to the base member so as to be movable between an engagement position at which the dog member is engaged with a striker on the glove compartment side and a disengagement position at which the engagement is released. The spring member is supported and fixed at a center portion thereof to the base member, locked at one end portion thereof to the knob member, and locked at another end portion thereof to the dog member.

In the above glove compartment lock device, the knob member is biased to the closed position on the one end portion side with respect to the center portion of the spring member, and the dog member is biased to the engagement position on the other end portion side with respect to the center portion of the spring member. That is, the knob member and the dog member are independently biased to the closed position and the engagement position, respectively, by using the one spring member. The knob member is restricted to the predetermined closed position and fixed in position in a state where a biasing force is applied thereto from the one end side of the spring member. The dog member is restricted to the predetermined engagement position and fixed in position in a state where a biasing force is applied thereto from the other end side of the spring member.

In the glove compartment lock device, when an opening operation is performed on the knob member from the closed position, the biasing force in the closed position direction applied from the spring member to the knob member is increased, so that loading during the opening operation of the knob member is realized. In addition, since the biasing force in the engagement position direction applied from the spring member to the dog member is increased, after the dog member moves to the disengagement position, an operation in which the dog member automatically returns from the disengagement position to the engagement position after the opening operation of the knob member is released is realized. Furthermore, when the glove compartment is closed from an opened state, even if the dog member moves from the engagement position to the disengagement position due to contact with the striker, the dog member is immediately returned from the disengagement position to the engagement position by the biasing force of the spring member, and thus the knob member is prevented from rotating to the opened position side. Accordingly, rattling of the knob member during transition from opening to closing of the glove compartment is prevented.

CITATION LIST

Patent Literature

Patent Literature 1: JP H8-207668 (A)

SUMMARY OF INVENTION

Technical Problem

In the above glove compartment lock device, however, the center portion of the spring member needs to be supported and fixed to the base member in order to bias the knob member and the dog member to the closed position and the engagement position, respectively, and thus the number of steps for assembly is increased.

The present invention has been made in view of such a problem, and an object of the present invention is to provide a glove compartment lock device having a reduced number of steps for assembly while realizing a desired lock function with one spring member.

Solution to Problem

An aspect of the present invention is directed to a glove compartment lock device including: a base member attached to a glove compartment and having a shaft portion extending in a predetermined direction; a knob member disposed on a front side of the glove compartment and supported by the base member so as to be rotatable around the shaft portion between a closed position and an opened position; an arm member swingably supported at a center portion in a longitudinal direction thereof by the base member and configured to come into contact with the knob member at one end portion thereof and to swing between a locked position at which the glove compartment is locked and an unlocked position at which the locking of the glove compartment is released; and a spring member rotatably and externally fitted to the shaft portion, locked at one end portion thereof to the knob member, locked at another end portion thereof to another end portion of the arm member, and configured to generate a biasing force that rotates the knob member to the closed position around the shaft portion and swings the arm member to the locked position, wherein the spring member is configured such that a rotation direction around the shaft portion in which the one end portion of the spring member rotates the knob member to the closed position and a rotation direction around the shaft portion in which the other end portion of the spring member swings the arm member to the locked position are opposite to each other.

Advantageous Effects of Invention

With this configuration, a lock function for opening/closing the glove compartment is realized by using the one spring member. In addition, the spring member is rotatably and externally fitted to the shaft portion of the base member, and the rotation direction around the shaft portion in which the one end portion of the spring member rotates the knob member to the closed position and the rotation direction around the shaft portion in which the other end portion of the spring member rotates the arm member to the locked position are opposite to each other. With this structure, the center portion of the spring member does not need to be fixed to the base member by using a fixture, so that the number of steps for assembly of the glove compartment lock device is reduced.

DESCRIPTION OF EMBODIMENTS

Hereinafter, specific embodiments of the glove compartment lock device according to the present invention will be described with reference to the drawings.

A glove compartment lock device 1 according to an embodiment is a lock device that is attached to a glove compartment 2 of a vehicle and that is for opening/closing the glove compartment 2. The glove compartment 2 is a storage unit installed in an interior member such as an instrument panel in front of the passenger seat in the vehicle compartment or the like, and is opened/closed with respect to the instrument panel or the like. As shown in FIG. 1, FIG. 2, FIG. 3, and FIG. 4, the glove compartment lock device 1 includes a base member 10, a knob member 20, an arm member 30, and a spring member 40. The glove compartment lock device 1 is composed of the base member 10, the knob member 20, the arm member 30, and the spring member 40.

Figure 5:
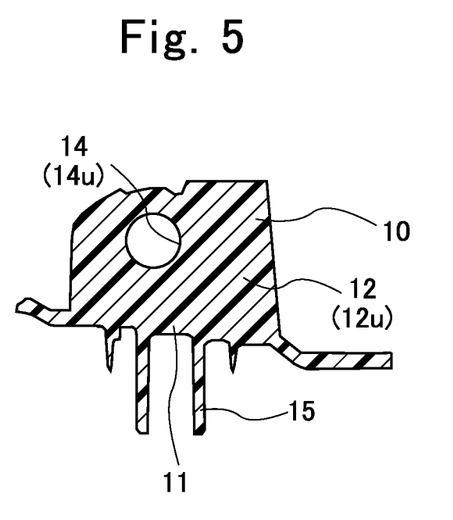
FIG. 5 is a cross-sectional view of a base member of the glove compartment lock device according to the embodiment, taken along a plane including the horizontal direction.
Figure 6:
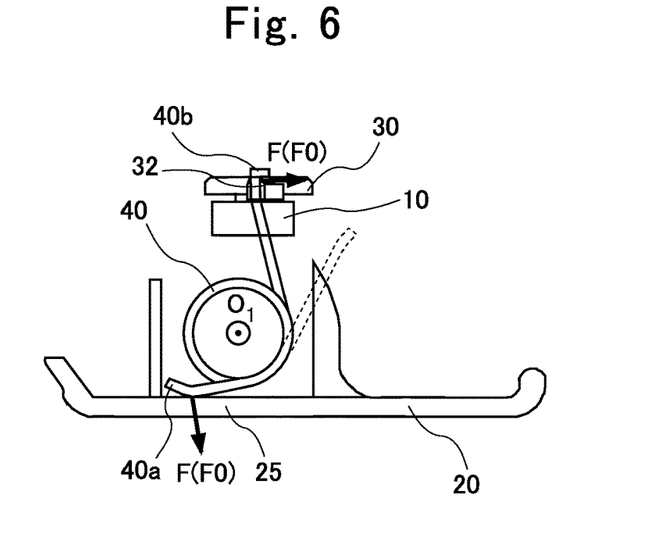
FIG. 6 is a schematic top view of the glove compartment lock device according to the embodiment at the knob closed position.

The base member 10 is a member attached and fixed to the glove compartment 2. The base member 10 is disposed on the front surface back side of the glove compartment 2. The base member 10 has a plate wall portion 11, a horizontal portion 12, and a shaft portion 13. The plate wall portion 11 is formed so as to extend parallel to the front surface back side of the glove compartment 2. As shown in FIG. 5, the horizontal portion 12 is formed so as to project horizontally from the plate wall portion 11. The horizontal portion 12 is provided at each of two upper and lower locations on the plate wall portion 11. The shaft portion 13 is formed in a cylindrical shape. The shaft portion 13 is provided at each of two upper and lower locations, and extends upward and downward from the horizontal portions 12 at the two upper and lower locations. Hereinafter, the horizontal portion 12 and the shaft portion 13 on the upper side are referred to as an upper horizontal portion 12u and an upper shaft portion 13u, respectively, and the horizontal portion 12 and the shaft portion 13 on the lower side are referred to as a lower horizontal portion 12d and a lower shaft portion 13d, respectively.

The upper shaft portion 13u extends upward from the upper surface of the upper horizontal portion 12u. The lower shaft portion 13d extends downward from the lower surface of the lower horizontal portion 12d. The upper horizontal portion 12u is provided with a through hole 14u. The through hole 14u penetrates the upper horizontal portion 12u in the up-down direction and communicates with a hollow portion of the upper shaft portion 13u. The lower horizontal portion 12d is provided with a through hole 14d. The through hole 14d penetrates the lower horizontal portion 12d in the up-down direction and communicates with a hollow portion of the lower shaft portion 13d. In the base member 10, a space is formed between the upper horizontal portion 12u and the lower horizontal portion 12d.

An end portion, on the front side of the glove compartment 2, of each horizontal portion 12 is formed such that the knob member 20 described in detail later can rotate around the shaft portion 13. In addition, the end portion of each horizontal portion 12 is formed so as to restrict rotation of the knob member 20 beyond a closed position by coming into contact with the knob member 20 when the knob member 20 reaches the closed position from the opened position side.

The knob member 20 is a plate-shaped member on which an operator is capable of performing an opening operation. The knob member 20 is disposed in the front surface of the glove compartment 2. The knob member 20 is an operation portion that opens the glove compartment 2 when the operator inserts their finger between the glove compartment 2 and the operation portion and pulls one end side (right side in FIG. 1 and FIG. 2) of the knob member 20 toward the near side of the operator. The knob member 20 has an accommodation portion 21. The accommodation portion 21 is a portion accommodated in the space between the upper horizontal portion 12u and the lower horizontal portion 12d of the base member 10.

The accommodation portion 21 is provided with insertion portions 22 and 23. Each of the insertion portions 22 and 23 is formed in a cylindrical shape or a columnar shape. The insertion portion 22 is provided at an upper portion of the accommodation portion 21 and projects upward. The insertion portion 23 is provided at a lower portion of the accommodation portion 21 and projects downward. The insertion portion 22 is inserted into the through hole 14u of the upper horizontal portion 12u. The insertion portion 23 is inserted into the through hole 14d of the lower horizontal portion 12d. The knob member 20 is supported by the base member 10 so as to be rotatable around the insertion portions 22 and 23, that is, the upper shaft portion 13u and the lower shaft portion 13d (that is, a rotation center $O_1$). The knob member 20 is rotatable between a closed position at which the knob member 20 is parallel to the front surface of the glove compartment 2 and an opened position for opening the glove compartment 2.

As shown in FIG. 3, FIG. 4, FIG. 6, and FIG. 8, the knob member 20 has an arm contact portion 24 and a spring locking portion 25. The arm contact portion 24 extends from a plate-shaped main body of the knob member 20 toward the front surface back side of the glove compartment 2, and is in contact with the arm member 30 described in detail later. The arm contact portion 24 has a role of transmitting rotation of the knob member 20 to the arm member 30. The spring locking portion 25 is a portion to which one end portion 40a of the spring member 40 described in detail later is locked. The spring locking portion 25 is formed in a groove shape such that the one end portion 40a of the spring member 40 is fitted thereto.

The arm member 30 is a member that swings with respect to the base member 10, and is swingably supported by the base member 10. The arm member 30 is disposed on the back side of the base member 10. The arm member 30 has a cylindrical shaft portion 31. The shaft portion 31 is provided at a center portion in the arm longitudinal direction. The shaft portion 31 is externally fitted to a shaft portion 15 provided on the back surface of the base member 10. The shaft portion 15 projects cylindrically from the back surface of the plate wall portion 11 of the base member 10 toward the back side in a horizontal direction. The shaft portion 15 is provided at each of two upper and lower locations, and extends from the plate wall portion 11 toward the back side in the horizontal direction. The shaft portion 31 is externally fitted to the shaft portion 15 on the lower side, of the shaft portions 15 at the two locations. The arm member 30 is supported at the center portion in the arm longitudinal direction thereof by the base member 10 so as to be swingable (around a swing center $O_2$).

Figure 7:
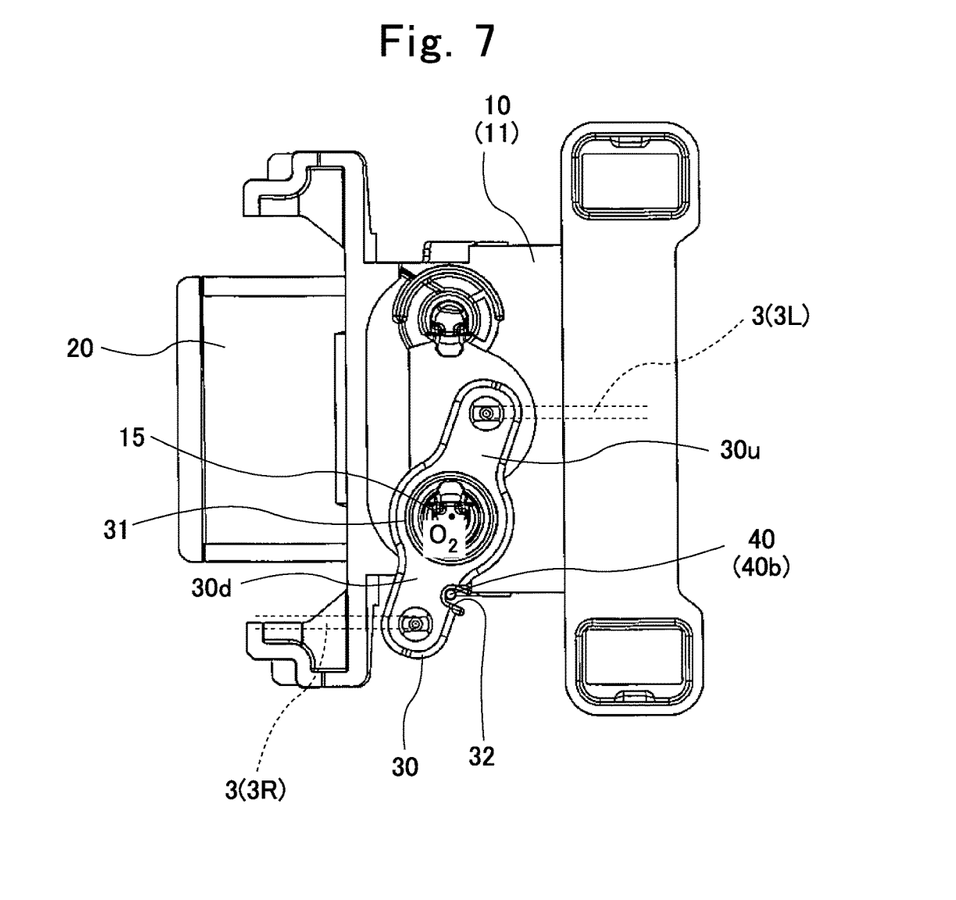
FIG. 7 is a rear view of the glove compartment lock device according to the embodiment at the knob closed position.
Figure 8:
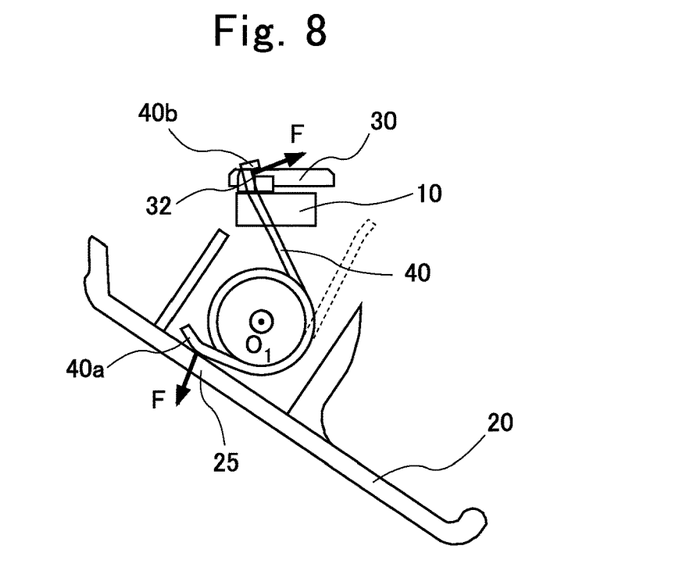
FIG. 8 is a schematic top view of the glove compartment lock device according to the embodiment at the knob opened position.
Figure 9:
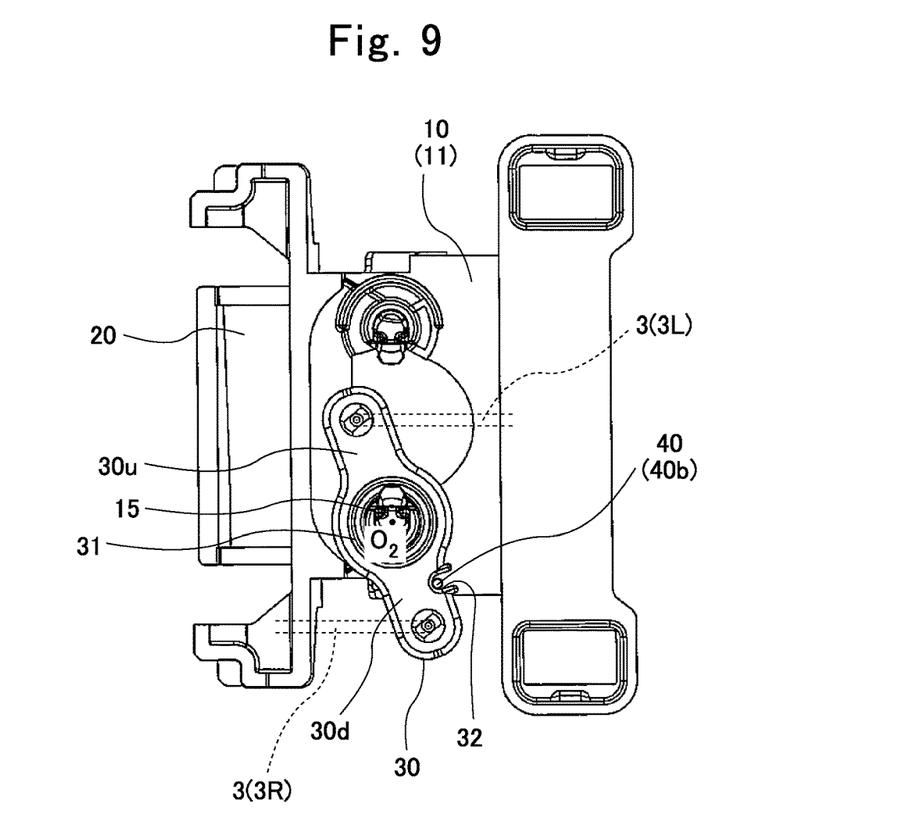
FIG. 9 is a rear view of the glove compartment lock device according to the embodiment at the knob opened position.

The arm member 30 has an upper portion 30u extending upward from the swing center $O_2$ and a lower portion 30d extending downward from the swing center $O_2$. As shown in FIG. 7 and FIG. 9, a latch 3 extending in a rod shape is connected to each of the upper part 30u and the lower part 30d of the arm member 30. The latch 3 is a member for opening/closing the glove compartment 2. The latch 3 includes a left latch 3L extending leftward from the arm member 30 and a right latch 3R extending rightward from the arm member 30 when viewed from the side on which the knob member 20 is operated.

The left latch 3L is rotatably supported by the upper portion 30u of the arm member 30. An end portion of the left latch 3L engages with and disengages from an interior member located on the left side of the glove compartment 2 when viewed from the side where the knob member 20 is operated. The right latch 3R is rotatably supported by the lower portion 30d of the arm member 30. An end portion of the right latch 3R engages with and disengages from an interior member located on the right side of the glove compartment 2 when viewed from the side where the knob member 20 is operated. The arm member 30 is swingable around the swing center $O_2$ between a locked position at which the glove compartment 2 is held in a locked state where the glove compartment 2 is closed and an unlocked position at which the locked state of the glove compartment 2 is released, such that the left latch 3L and the right latch 3R advance and retract with respect to the interior members from the glove compartment 2 in synchronization with each other.

The arm member 30 has a portion that restricts swinging beyond the locked position by coming into contact with the base member 10 when the locked position is reached from the unlocked position side. Alternatively, instead of the restriction portion of the arm member 30, the arm member 30 is restricted from swinging beyond the locked position by the latch 3 coming into contact with the interior member side to prevent further advancement of the latch 3 when the locked position is reached from the unlocked position side.

The arm member 30 has a spring locking portion 32 and a knob contact portion 33. The spring locking portion 32 is a portion to which another end portion 40b of the spring member 40 described in detail later is locked, and is provided at the lower portion 30d of the arm member 30. The spring locking portion 32 is formed in a groove shape such that the other end portion 40b of the spring member 40 is fitted thereto. The knob contact portion 33 is a portion that comes into contact with the arm contact portion 24 of the knob member 20, and is provided at the upper portion 30u of the arm member 30. The knob contact portion 33 is formed so as to project from the surface, facing the base member 10, of the arm member 30 toward the base member 10.

The spring member 40 is a twisted coil spring that generates a biasing force that rotates the knob member 20 to the closed position around the lower shaft portion 13d of the base member 10 and swings the arm member 30 to the locked position. The spring member 40 is rotatably and externally fitted to the shaft portion 13 (specifically, the lower shaft portion 13d) of the base member 10. The spring member 40 is not fixed to the base member 10 and is supported such that rotation of the spring member 40 around the lower shaft portion 13d is allowed. The spring member 40 is configured to be locked at the one end portion 40a thereof to the spring locking portion 25 of the knob member 20 and locked at the other end portion 40b thereof to the spring locking portion 32 of the arm member 30.

The knob member 20 is set such that, at the closed position thereof, a pressing force applied from the arm contact portion 24 to the knob contact portion 33 when the knob contact portion 33 of the arm member 30 comes into contact with the arm contact portion 24 is almost zero, or the knob contact portion 33 does not come into contact with the arm contact portion 24. At the closed position of the knob member 20, the arm member 30 is swung around the swing center $O_2$ in a first rotation direction (counterclockwise direction in FIG. 2 and clockwise direction in FIG. 7) by the biasing force of the spring member 40, and the swinging thereof is restricted at the locked position. When an opening operation is performed on the knob member 20 from the closed position to the opened position, the pressing force applied from the arm contact portion 24 to the knob contact portion 33 is increased by the operation force, so that the arm member 30 swings around the swing center $O_2$ in a second rotation direction (clockwise direction in FIG. 2 and counterclockwise direction in FIG. 9) opposite to the above first rotation direction.

The spring member 40 is maintained in a state of being wound in the circumferential direction from the natural state of the spring member 40 by latch locking at the closed position of the knob member 20. The spring member 40 generates a biasing force F that rotates the knob member 20 toward the closed position and swings the arm member 30 toward the locked position. The biasing force F of the spring member 40 is a smallest force FO at the closed position of the knob member 20, and gradually increases from the closed position of the knob member 20 to the opened position of the knob member 20.

The spring member 40 is configured such that a rotation direction (counterclockwise in FIG. 6) around the shaft portion 13 (center $O_1$) in which the one end portion 40a rotates the knob member 20 to the closed position and a rotation direction (clockwise direction in FIG. 6) around the shaft portion 13 (center $O_1$) in which the other end portion 40b rotates the arm member 30 to the locked position are opposite to each other. In addition, the spring member 40 is configured such that, during rotation of the knob member 20 from the closed position side to the opened position side (during an opening operation), a rotation direction (clockwise direction in FIG. 6) in which the one end portion 40a side rotates around the shaft portion 13 due to the locking of the spring member 40 to the knob member 20 and a rotation direction (counterclockwise in FIG. 6) in which the other end portion 40b side rotates around the shaft portion 13 due to swinging of the arm member 30 with contact between the knob member 20 and the arm member 30 are opposite to each other.

Next, operation of the glove compartment lock device 1 will be described.

In the glove compartment lock device 1, the spring member 40 generates a biasing force that rotates the knob member 20 to the closed position around the lower shaft portion 13d of the base member 10 and swings the arm member 30 to the locked position. Therefore, when the glove compartment 2 is closed and an opening operation is not performed on the knob member 20, the knob member 20 is maintained at the closed position, and the arm member 30 is maintained at the locked position, by the biasing force of the spring member 40. In this case, the glove compartment 2 is closed by the latch 3 advancing from the glove compartment 2 to the interior member side and engaging with the interior member side.

Then, when an opening operation is performed on the knob member 20 from the closed position in the closed state of the glove compartment 2, the arm contact portion 24 of the knob member 20 comes into contact with the knob contact portion 33 of the arm member 30 and presses the arm member 30 in the above second rotation direction, so that the arm member 30 swings in the above second rotation direction against the biasing force of the spring member 40. Then, when the arm member 30 swings to the unlocked position, the latch 3 retracts to the glove compartment 2 side and the engagement with the interior member side is released, whereby the glove compartment 2 is opened.

When the arm member 30 swings with the opening operation of the knob member 20 as described above, the biasing force in the closed position direction applied from the spring member 40 to the knob member 20 is increased due to the opening operation of the knob member 20. Therefore, loading during the opening operation of the knob member 20 is realized. Moreover, when the arm member 30 swings with the opening operation of the knob member 20, the biasing force in the locked position direction applied from the spring member 40 to the arm member 30 is increased due to the swinging of the arm member 30. Therefore, after the arm member 30 swings to the unlocked position, an operation in which the arm member 30 automatically returns from the unlocked position to the locked position after the opening operation of the knob member 20 is released is realized. Accordingly, after the glove compartment 2 is opened, the latch 3 is allowed to advance from the glove compartment 2 to the interior member side in the opened state of the glove compartment 2 to engage with the interior member side.

When the glove compartment 2 is closed by a pressing operation of the operator from the opened state, the latch 3 slightly retracts to the glove compartment 2 side by being pressed by the engagement portion on the interior member side against the biasing force of the spring member 40 immediately before engagement with the interior member side in a state where the latch 3 has advanced to the interior member side. When the latch 3 retracts, the arm member 30 swings from the locked position to the unlocked position side. The amount by which the latch 3 retracts, that is, an angle by which the arm member 30 swings to the unlocked position side, at this time is set such that a biasing force that rotates the knob member 20 to the closed position and swings the arm member 30 to the locked position is constantly generated at the spring member 40.

The arm member 30 is biased to the locked position by the biasing force of the spring member 40. Therefore, when the pressing force in the retraction direction applied from the engagement portion on the interior member side to the latch 3 as described above becomes eliminated, the latch 3 advances to the interior member side again due to swinging of the arm member 30 to the locked position by the biasing force of the spring member 40. In this case, the glove compartment 2 is closed by the latch 3 engaging with the interior member side. In addition, in this case, in the process where the glove compartment 2 is closed from the opened state, the biasing force in the closed position direction applied from the spring member 40 to the knob member 20 is continuously maintained, so that the knob member 20 is prevented from rotating to the opened position side. Accordingly, rattling of the knob member 20 during transition from opening to closing of the glove compartment 2 is prevented.

In the glove compartment lock device 1, a lock function of opening/closing the glove compartment 2 without rattling of the knob member 20 during transition from opening to closing of the glove compartment 2 is realized by using the one spring member 40. The spring member 40 is rotatably and externally fitted to the shaft portion 13 (specifically, the lower shaft portion 13d) of the base member 10, and is not fixed to the base member 10 but rotatably supported by the base member 10.

The biasing force of the spring member 40 acts such that the rotation direction around the shaft portion 13 in which the one end portion 40a rotates the knob member 20 to the closed position and the rotation direction around the shaft portion 13 in which the other end portion 40b rotates the arm member 30 to the locked position are opposite to each other. With this structure, the spring member 40 is self-fixed to the base member 10, and the center portion of the spring member 40 does not need to be fixed to the base member 10 by using a fixture. Therefore, the spring member 40 is easily handled during assembly of the glove compartment lock device 1, and is easily assembled. Accordingly, the number of steps for assembly of the glove compartment lock device 1 is reduced, so that the manufacturing cost is reduced.

Therefore, the number of steps for assembly of the glove compartment lock device 1 is reduced while a lock function of opening/closing the glove compartment 2 without rattling of the knob member 20 during transition from opening to closing of the glove compartment 2 is realized by using the one spring member 40 in the glove compartment lock device 1.

Meanwhile, in the above embodiment, the shaft portion 13 of the base member 10 extends in the up-down direction, and the knob member 20 swings around the shaft portion 13 in a plane including the horizontal direction. However, the present invention is not limited thereto, and may be applied to a glove compartment lock device in which the shaft portion 13 of the base member 10 extends in the horizontal direction and the knob member 20 swings around the shaft portion 13 in a plane including the vertical direction.

In the above embodiment, each of the horizontal portion 12, the shaft portion 13, and the shaft portion 15 of the base member 10 is provided at each of the two upper and lower locations, the spring member 40 is rotatably and externally fitted to the lower shaft portion 13d, and the arm member 30 is swingably and externally fitted to the shaft portion 15 on the lower side. However, the present invention is not limited thereto, and may be applied to a glove compartment lock device in which the spring member 40 is rotatably and externally fitted to the upper shaft portion 13u and the arm member 30 is swingably and externally fitted to the shaft portion 15 on the upper side.

Figure 1:
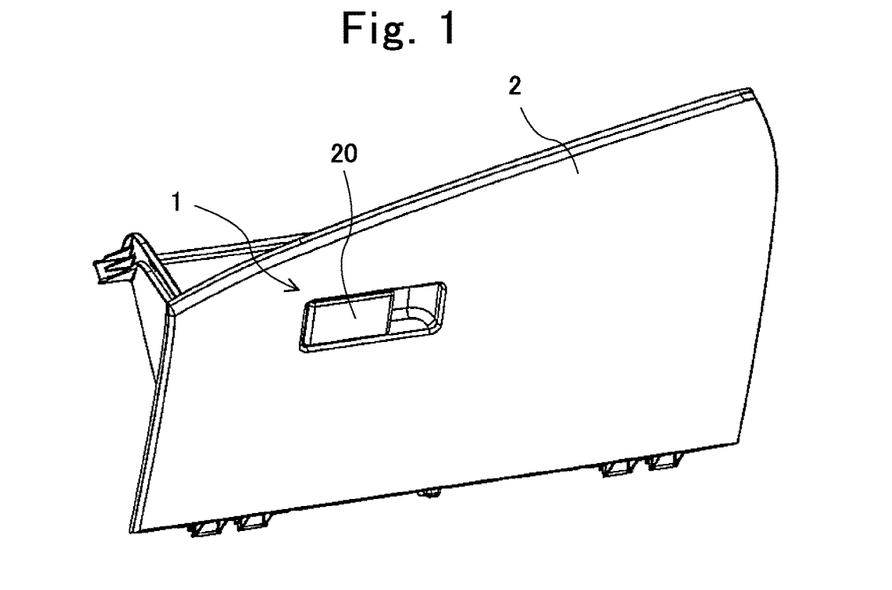
FIG. 1 is a perspective view of a glove compartment to which a glove compartment lock device according to an embodiment is applied.
Figure 2:
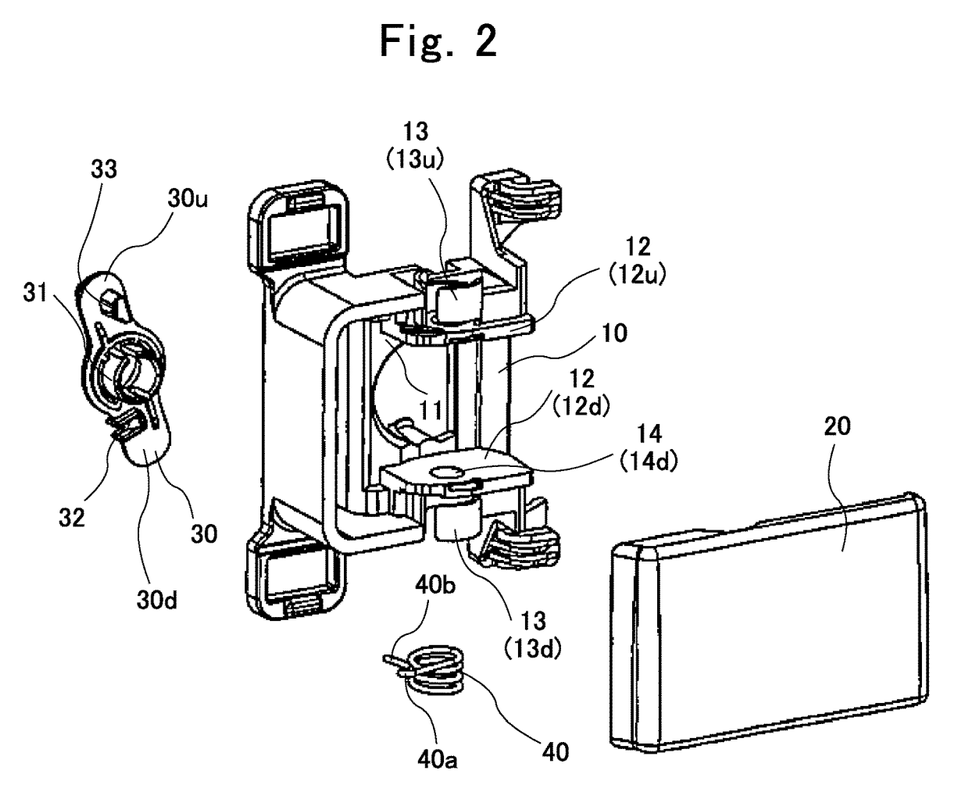
FIG. 2 is an exploded perspective view of the glove compartment lock device according to the embodiment.
Figure 3:
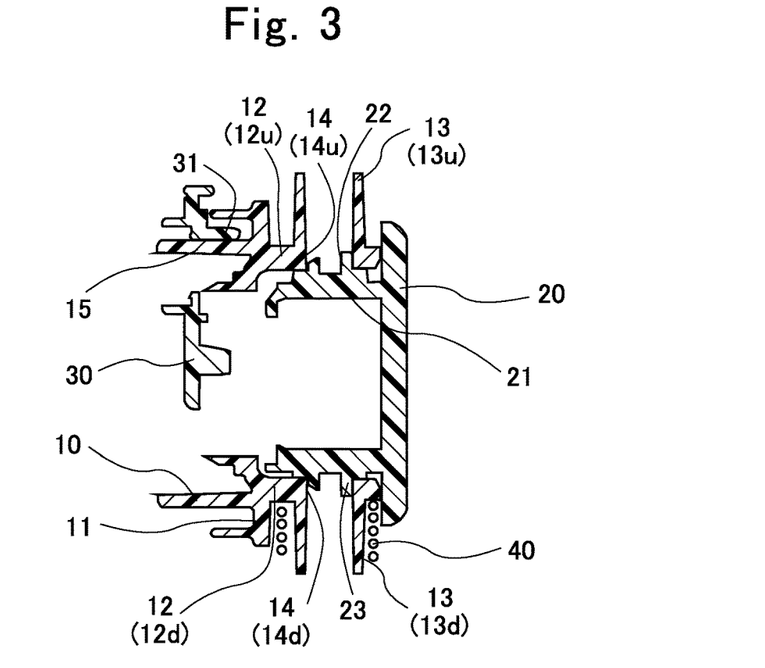
FIG. 3 is a cross-sectional view of the glove compartment lock device according to the embodiment, taken along a plane including the vertical direction.
Figure 4:
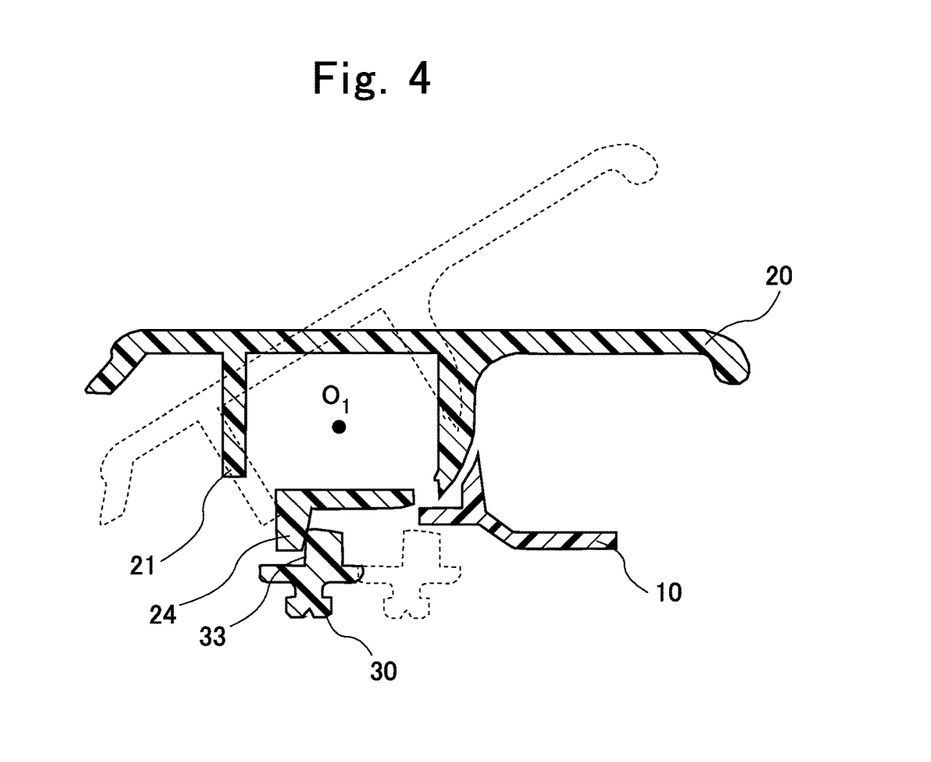
FIG. 4 is a cross-sectional view of the glove compartment lock device according to the embodiment, taken along a plane including a horizontal direction (note that a knob closed position and a knob opened position are shown by a solid line and a broken line, respectively)

In the above embodiment, the glove compartment 2 is opened by a right-side opening operation in which the right side of the knob member 20 is pulled toward the near side with respect to the base member 10 as shown in FIG. 1 and FIG. 2. However, the present invention is not limited thereto, and may be applied to a glove compartment lock device with which the glove compartment 2 is opened by a left-side opening operation in which the left side of the knob member 20 is pulled toward the near side with respect to the base member 10. In the above embodiment, the base member 10 has the horizontal portion 12, the shaft portion 13, and the shaft portion 15 each of which is provided at each of the two upper and lower locations. Therefore, components including the base member 10 are shared by a configuration in which the opening operation of the glove compartment 2 is realized by the right opening operation of the knob member 20 and a configuration in which the opening operation of the glove compartment 2 is realized by the left-side opening operation of the knob member 20.

The present invention is not limited to the embodiments and modifications described above, and various changes may be made without departing from the gist of the present invention.

DESCRIPTION OF REFERENCE CHARACTERS 1 glove compartment lock device
2 glove compartment
3 latch
10 base member
13 shaft portion
20 knob member
24 arm contact portion
25 spring locking portion
30 arm member
32 spring locking portion
33 knob contact portion
40 spring member

The invention claimed is:

1. A glove compartment lock device comprising:
a base member attached to a glove compartment and having a shaft portion extending in a predetermined direction;
a knob member disposed on a front side of the glove compartment and supported by the base member so as to be rotatable around the shaft portion between a closed position and an opened position;
an arm member swingably supported at a center portion in a longitudinal direction thereof by the base member and configured to come into contact with the knob member at one end portion thereof and to swing between a locked position at which the glove compartment is locked and an unlocked position at which the locking of the glove compartment is released; and
a spring member rotatably and externally fitted to the shaft portion, locked at one end portion thereof to the knob member, locked at another end portion thereof to another end portion of the arm member, and configured to generate a biasing force that rotates the knob member to the closed position around the shaft portion and swings the arm member to the locked position, wherein
the spring member is configured such that a rotation direction around the shaft portion in which the one end portion of the spring member rotates the knob member to the closed position and a rotation direction around the shaft portion in which the other end portion of the spring member swings the arm member to the locked position are opposite to each other.

2. The glove compartment lock device according to claim 1, wherein the spring member is configured such that, during rotation of the knob member from the closed position side to the opened position side, a rotation direction in which the one end portion side of the spring member rotates around the shaft portion due to the locking of the spring member to the knob member and a rotation direction in which the other end portion side of the spring member rotates around the shaft portion due to the swinging of the arm member with contact between the knob member and the arm member are opposite to each other.

3. The glove compartment lock device according to claim 1, wherein the biasing force by the spring member is increased from the closed position side of the knob member to the opened position side of the knob member.

4. The glove compartment lock device according to claim 1, wherein the knob member has an arm contact portion projected toward the arm member and configured to come into contact with the one end portion of the arm member.

* * * * *